United States Patent
Jung

(10) Patent No.: US 7,306,207 B2
(45) Date of Patent: Dec. 11, 2007

(54) METHOD AND SYSTEM FOR ADJUSTING INTERNAL PRESSURE OF GAS LIFTER USING ANGLE SENSOR

(75) Inventor: Serk-Young Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 204 days.

(21) Appl. No.: 11/200,485

(22) Filed: Aug. 8, 2005

(65) Prior Publication Data
US 2006/0028058 A1  Feb. 9, 2006

(30) Foreign Application Priority Data
Aug. 9, 2004  (KR) ............ 10-2004-0062343

(51) Int. Cl.
*F16F 9/43* (2006.01)

(52) U.S. Cl. .............. 267/64.28; 188/282.2; 188/269

(58) Field of Classification Search ............ 188/282.2, 188/269; 267/64.28, 64.11, 64.15, 64.16
See application file for complete search history.

(56) References Cited

U.S. PATENT DOCUMENTS

| | | | |
|---|---|---|---|
| 4,313,529 A * | 2/1982 | Kato et al. | 188/266.4 |
| 5,522,483 A * | 6/1996 | Koch | 188/282.2 |
| 6,698,729 B2 * | 3/2004 | Popjoy | 267/64.28 |

* cited by examiner

*Primary Examiner*—Melanie Torres
(74) *Attorney, Agent, or Firm*—Morgan Lewis & Bockius LLP

(57) ABSTRACT

A method and system for adjusting internal pressure of a gas lifter includes measuring a variable opened angle of an openable object, such as a hood, a trunk lid or a tailgate, using an angle sensor, and adjusting the internal pressure of the gas lifter according to the measured opened angle of the openable object. The present invention helps a user easily open or close the openable object.

5 Claims, 4 Drawing Sheets

METHOD AND SYSTEM FOR ADJUSTING INTERNAL PRESSURE OF GAS LIFTER USING ANGLE SENSOR

CROSS-REFERENCE TO RELATED APPLICATIONS

The present application is based on, and claims priority from, Korean Application Serial Number 10-2004-0062343, filed on Aug. 9, 2004, the disclosure of which is hereby incorporated by reference herein in its entirety.

FIELD OF THE INVENTION

The present invention relates to gas lifters which are used for opening and closing hoods, trunk lids or tailgates and, more particularly, to a method and system for adjusting the internal pressure of a gas lifter in which greater pressure is applied when opening and in which less pressure is applied when closing the openable object, thus helping the user easily close the openable object.

BACKGROUND OF THE INVENTION

Generally, a hood, a trunk lid or a tailgate for vehicles has a structure such that a user can easily lift with assistance from the expansive force of a gas lifter. In other words, the gas lifter lightens the load a user must lift when opening the hood, the trunk lid or the tailgate, and maintains the opened state of the hood, the trunk lid or the tailgate after it has been completely opened.

As such, when opening the hood, the trunk lid or the tailgate, the conventional gas lifter helps the user easily open it. However, conversely, when it is desired to close the hood, the trunk lid or the tailgate, the gas conventional lifter makes it more difficult for the user to close the hood, the trunk lid or the tailgate because of the reaction force of the gas lifter. In particular, in the case of the hood, if the vehicle travels with a hood that is not completely closed, a safety hazard may occur.

SUMMARY OF THE INVENTION

Embodiments of the present invention provide a method of adjusting the internal pressure of a gas lifter which increases the internal pressure of the gas lifter while opening an openable object, such as a hood, a trunk lid or a tailgate, so that greater pressure is applied to the openable object, thus helping a user easily open the openable object, and which reduces the internal pressure of the gas lifter while closing the openable object, so that less pressure is applied to the openable object, thus helping the user easily close the openable object, thereby being more convenient for the user.

In an exemplary embodiment of the present invention, a gas lifter is coupled to an openable object, such as a hood, a trunk lid or a tailgate, and has a structure such that the internal pressure of the gas lifter is adjusted when opening or closing the openable object. A method according to one embodiment includes measuring a variable opened angle of the openable object using an angle sensor, and adjusting the internal pressure of the gas lifter according to the measured opened angle of the openable object. When the openable object is being opened, the internal pressure of the gas lifter may decrease as the openable object approaches a completely opened state.

The opening motion of the openable object may be divided into four opening ranges, and first, second, third and fourth opening internal pressure values may be applied to the gas lifter when the openable object is in first, second third and fourth opening ranges respectively. The first through fourth opening internal pressure values may satisfy a condition such that the first opening internal pressure value is greater than the second opening internal pressure value, which is greater than the third opening internal pressure value, which is greater than the fourth opening internal pressure value.

Each of the first through third opening internal pressure values may be greater than a normal internal pressure of the gas lifter, and the fourth opening internal pressure value may be less than the normal internal pressure of the gas lifter.

When the openable object is being closed, the internal pressure of the gas lifter may increase and then decrease as the openable object approaches a completely closed The closing motion of the openable object may be divided into four closing ranges, and first, second, third and first closing internal pressure values may be applied to the gas lifter when the openable object is in first, second, third and fourth closing ranges, respectively. The first through third closing internal pressure values may satisfy a condition such that the first closing internal pressure value is less than the second closing internal pressure value, which is less than the third closing internal pressure value.

Each of the first through third closing internal pressure values may be less than a normal internal pressure of the gas lifter. The method may further include generating a warning sound when the openable object is not completely closed after closing the openable object.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, an exemplary embodiment of the present invention will be described with reference to the attached drawings.

Figure 1:
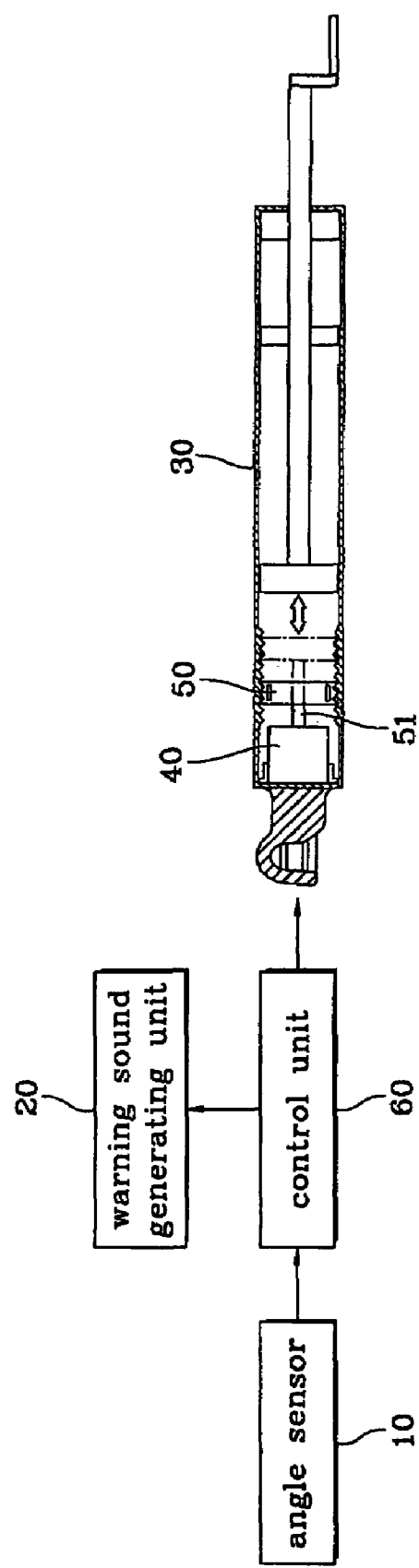
FIG. 1 is a block diagram of a system for adjusting the internal pressure of a gas lifter using an angle sensor, according to an embodiment of the present invention.
Figure 2:
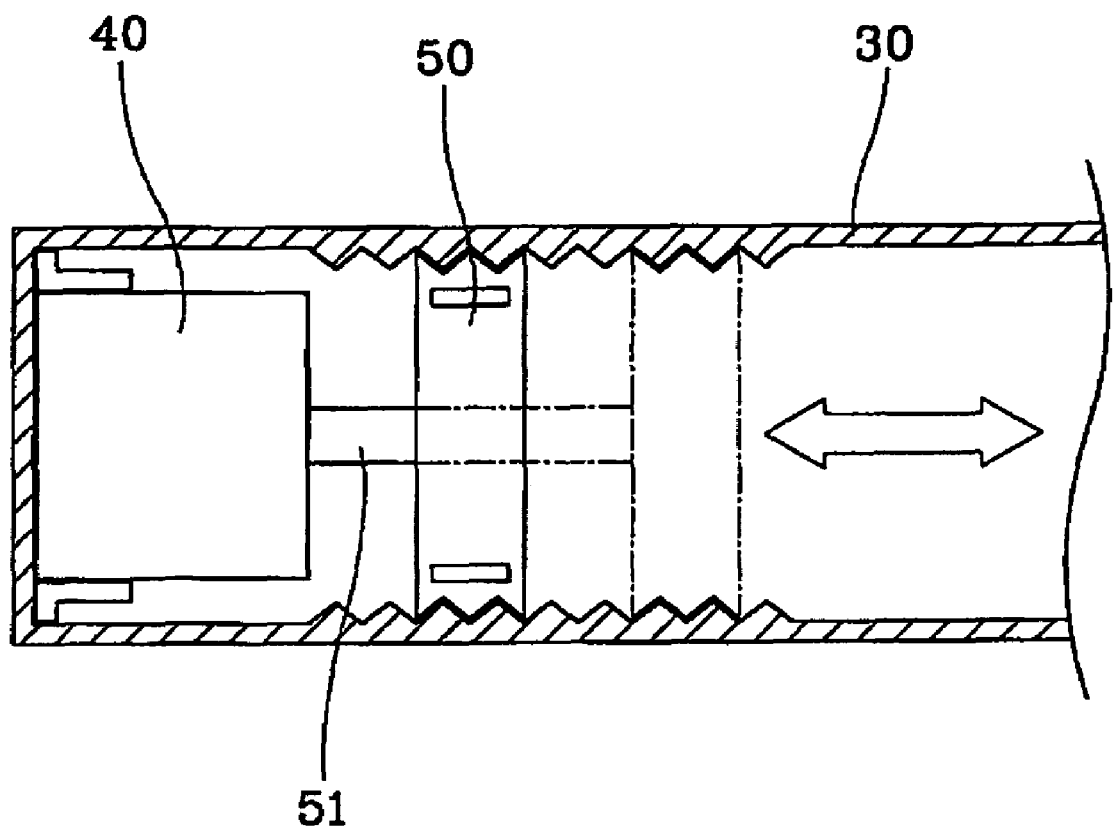
FIG. 2 is a sectional view showing an enlargement of a stepping motor installed in the gas lifter of FIG. 1.

As shown in FIGS. 1 and 2, the angle sensor 10 senses a variable opened angle of an openable object, such as a hook, a trunk lid or a tailgate and sends the sensing signal to a control unit 60. The control unit 60 adjusts the internal pressure of the gas lifter 30 according to the variable opened angle of the openable object, which is sensed by the angle sensor 10. The control unit 60 also operates a warning sound generating unit 20 which generates a warning sound when the openable object has not been completely closed after closing the openable object. Control unit 60 may comprise a processor and associated hardware and software as may be selected and programmed by a person of ordinary skill in the art and based on the teachings contained herein.

The gas lifter 30 has the stepping motor 40 which is operated under the control of the control unit 60, and a pressure adjusting plate 50 which is coupled to the stepping motor 40 by a connection rod 51. The pressure adjusting plate 50 is advanced or retracted by the operation of the stepping motor 40, thus increasing or decreasing the internal pressure of the gas lifter 30.

A method of adjusting the internal pressure of the gas lifter 30 using the angle sensor 10 according to the present invention used in the above-mentioned system will be described herein below with reference to the flowchart shown in FIG. 3.

Figure 3:
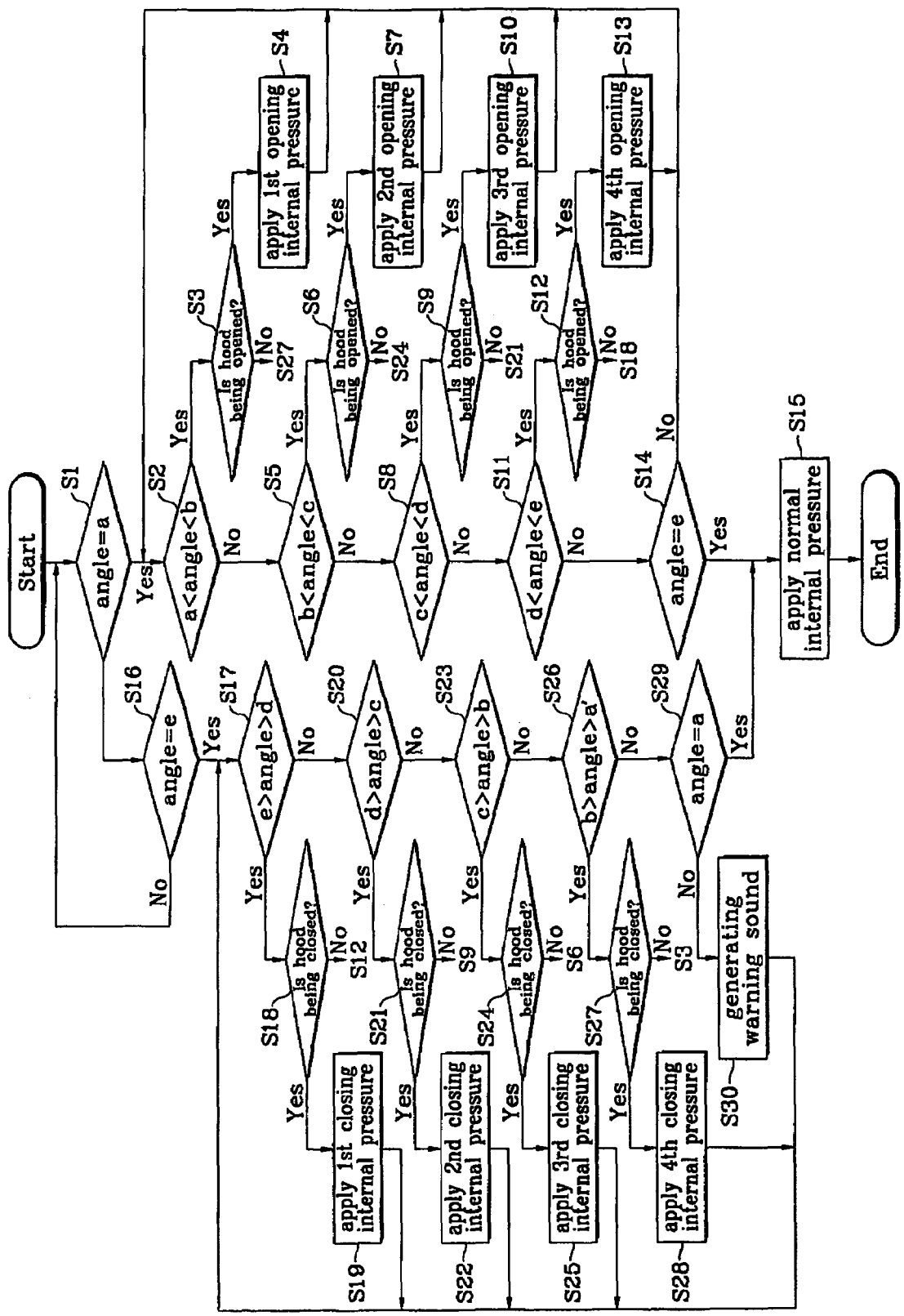
FIG. 3 is a flowchart illustrating a method of adjusting the internal pressure of the gas lifter using the angle sensor according to the present invention.
Figure 4:
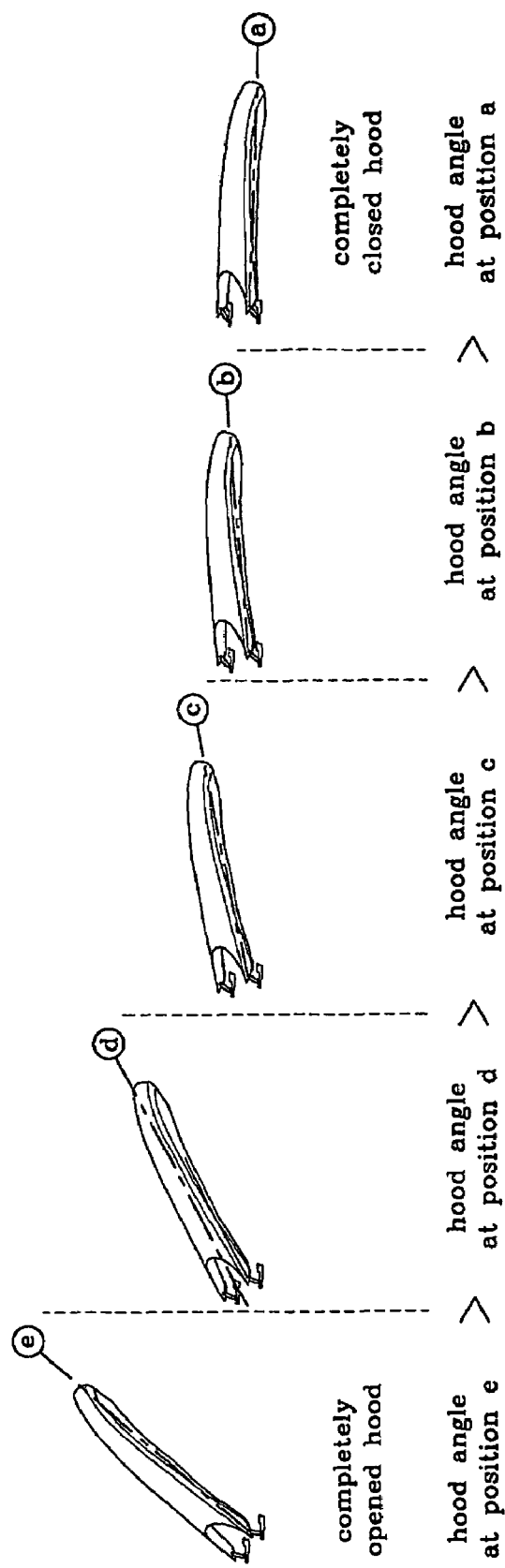
FIG. 4 is a sequential depiction showing angles of the gas lifter sensed by the angle sensor according to a variable opened position of an openable object, according to an embodiment of the present invention.

As shown in FIG. 3, at step SI, the control unit 60 determines, using the sensing signal from the angle sensor 10 whether the angle of the openable object 70, such as a hood, a trunk lid or tailgate, is the same as an angle corresponding to position a shown in FIG. 4, that is, whether the openable object 70 is completely closed or not. If the angle of the openable object 70 is the same as the angle corresponding to position a, the gas lifter internal pressure adjusting process goes to step S2. If not, the process goes to step S16.

At step S2, it is determined whether the angle of the openable object 70, sensed by the sensor 10, is between angles corresponding to positions a and b shown in FIG. 4. If the openable object 70 is between positions a and b, the process goes to step S3. If not, the process goes to step S5. At step S3, it is determined whether the openable object 70 is being opened, that is, whether the openable object 70 is moving from position a towards position b. If the openable object 70 is moving from position a towards position b, the process goes to step S4. If not, the process goes to step S27. Here, the control unit 60 determines that the openable object 70 is moving from position a towards position b when the openable object 70 was in position a and is between positions a and b. At step S4, the control unit 60 adjusts the internal pressure of the gas lifter 30 to a first opening internal pressure value.

At step S5, it is determined whether the angle of the openable object 70, sensed by the angle sensor 10, is between angles corresponding to positions b and c shown in FIG. 4. If the angle of the openable object 70 is between the angles corresponding to positions b and c, the process goes to step S6. If not, the process goes to step S8. Whether the openable object 70 is being opened is determined at step S6. In other words, at step S6, it is determined whether the openable object 70 is moving from position b towards position c. If the openable object 70 is moving from position b towards position c, the process goes to step S7. If not, the process goes to step S24. Here, the control unit 60 determines that the openable object 70 is moving from position b towards position c when the openable object 70 was in position b and is between positions b and c. At step S7, the control unit 60 adjusts the internal pressure of the gas lifter 30 to a second opening internal pressure value.

At step S8, it is determined whether the angle of the openable object 70, sensed by the angle sensor 10, is between angles corresponding to positions c and d shown in FIG. 4. If the angle of the openable object 70 is between the angles corresponding to positions c and d, the process goes to step S9. If not, the process goes to step S11. Whether the openable object 70 is being opened is determined at step S9. In other words, at step S9, it is determined whether the openable object 70 is moving from position c towards position d. If the openable object 70 is moving from position c towards position d, the process goes to step S10. If not, the process goes to step S21. Here, the control unit 60 determines that the openable object 70 is moving from position c towards position d when the openable object 70 was in position c and is between positions c and d. At step S10, the control unit 60 adjusts the internal pressure of the gas lifter 30 to a third opening internal pressure value.

At step S11, it is determined whether the angle of the openable object 70, sensed by the angle sensor 10, is between angles corresponding to positions d and e shown in FIG. 4. If the angle of the openable object 70 is between the angles corresponding to positions d and e, the process goes to step S12. If not, the process goes to step S14. Whether the openable object 70 is being opened is determined at step S12. In other words, at step S12, it is determined whether the openable object 70 is moving from position d towards position e. If the openable object 70 is moving from position d towards position e, the process goes to step S13. If not, the process goes to step S18. Here, the control unit 60 determines that the openable object 70 is moving from position d towards position e when the openable object 70 was in position d and is between positions d and e. At step S13, the control unit 60 adjusts the internal pressure of the gas lifter 30 to a fourth opening internal pressure value.

At step S14, the control unit 60 determines, using the sensing signal from the angle sensor 10, whether the openable object 70 is at position e of FIG. 4. That is, whether the openable object 70 is completely opened is determined. If the openable object 70 is at position e, the process goes to step S15. At step S15, the control unit 60 maintains the gas lifter 30 at normal internal pressure.

Here, the first through fourth opening internal pressure values satisfy a condition such that the first opening internal pressure value is greater than (>) the second opening internal pressure value, which is greater than (>) the third opening internal pressure value, which is greater than (>) the fourth opening internal pressure value. Each of the first through third opening internal pressure values is greater than the normal internal pressure of the gas lifter 30, and the fourth opening internal pressure value is less than the normal internal pressure of the gas lifter 30. Therefore, the openable object 70 is quickly opened by the greater pressure at an initial opening stage, and the opening speed of the openable object 70 is reduced as it approaches the completely opened state. As a result, the openable object 70 is smoothly stopped at the completely opened position.

Meanwhile, at step S16, the control unit 60 determines, using the sensing signal from the angle sensor 10, whether the angle of the openable object 70, such as a hood, a trunk lid or tailgate, is the same as the angle corresponding to position e shown in FIG. 4, that is, whether the openable object 70 is completely opened or not. If the angle of the openable object 70 is the same as the angle corresponding to position e, the internal pressure adjusting process goes to step S17.

At step S17, it is determined whether the angle of the openable object 70, sensed by the angle sensor 10, is between the angles corresponding to positions e and d shown in FIG. 4. If the angle of the openable object 70 is between the angles corresponding to positions e and d, the process goes to step S18. If not, the process goes to step S20. Whether the openable object 70 is being closed is determined at step S18. In other words, at step S18, it is determined whether the openable object 70 is moving from position e towards position d. If the openable object 70 is moving from position e towards position d, the process goes to step S19. If not, the process goes to step S12. Here, the control unit 60 determines that the openable object 70 is moving from position e towards position d when the openable object 70 was in position e and is between positions e and d. At step S19, the control unit 60 adjusts the internal pressure of the gas lifter 30 to a first closing internal pressure value.

At step S20, it is determined whether the angle of the openable object 70, sensed by the angle sensor 10, is between the angles corresponding to positions d and c shown in FIG. 4. If the angle of the openable object 70 is between the angles corresponding to positions d and c, the process goes to step S21. If not, the process goes to step S23. Whether the openable object 70 is being closed is determined at step S21. In other words, at step S21, it is determined whether the openable object 70 is moving from position d towards position c. If the openable object 70 is moving from position d towards position c, the process goes to step S22. If not, the process goes to step S9. Here, the control unit 60 determines that the openable object 70 is moving from position d towards position c when the openable object 70 was in position d and is between positions d and c. At step S22, the control unit 60 adjusts the internal pressure of the gas lifter 30 to a second closing internal pressure value.

At step S23, it is determined whether the angle of the openable object 70, sensed by the angle sensor 10, is between the angles corresponding to positions c and b shown in FIG. 4. If the angle of the openable object 70 is between the angles corresponding to positions c and b, the process goes to step S24. If not, the process goes to step S26. Whether the openable object 70 is being closed is determined at step S24. In other words, at step S24, it is determined whether the openable object 70 is moving from position c towards position b. If the openable object 70 is moving from position c towards position b, the process goes to step S25. If not, the process goes to step S6. Here, the control unit 60 determines that the openable object 70 is moving from position c towards position b when the openable object 70 was in position c and is between positions c and b. At step S25, the control unit 60 adjusts the internal pressure of the gas lifter 30 to a third closing internal pressure value.

At step S26, it is determined whether the angle of the openable object 70, sensed by the angle sensor 10, is between the angles corresponding to positions b and a' (the angle of the openable object 70 at position a' is a little greater than the angle at position a, but is less than the angle at position b). If the angle of the openable object 70 is between the angles corresponding to positions b and a', the process goes to step S27. If not, the process goes to step S29. Whether the openable object 70 is being closed is determined at step S27. In other words, at step S27, it is determined whether the openable object 70 is moving from position b towards position a'. If the openable object 70 is moving from position b towards position a', the process goes to step S28. If not, the process goes to step S3. Here, the control unit 60 determines that the openable object 70 is moving from position b towards position a' when the openable object 70 was in position b and is between positions b and a'. At step S28, the control unit 60 adjusts the internal pressure of the gas lifter 30 to the first closing internal pressure value.

At step S29, the control unit 60 determines, using the sensing signal from the angle sensor 10, whether the openable object 70 is at position a shown in FIG. 4. That is, whether the openable object 70 is completely closed is determined. If the openable object 70 is at position a, the process goes to step S15. Thus, the control unit 60 maintains the gas lifter 30 at normal internal pressure. If the openable object 70 is not at position a, the process goes to step S30, thus generating a warning sound.

Here, the first through third closing internal pressure values satisfy a condition such that the first closing internal pressure value is less than (<) the second closing internal pressure value, which is less than (<) the third closing internal pressure value. Each of the first through third closing internal pressure values is less than the normal internal pressure of the gas lifter 30. Accordingly, the openable object 70 is quickly closed at an initial closing stage. As well, the internal pressure of the gas lifter 30 is reduced at a final closing stage, thus helping the openable object 70 enter the completely closed state.

As is apparent from the foregoing, there is an advantage in a method of adjusting an internal pressure of a gas lifter according to the present invention in that an internal pressure of the gas lifter is increased while opening an openable object, such as a hood, a trunk lid or a tailgate, so that greater pressure is applied to the openable object, thus helping a user easily open the openable object, and in which the internal pressure of the gas lifter is reduced while closing the openable object, so that less pressure is applied to the openable object, thus helping the user easily close the openable object, thereby being more convenient for the user.

What is claimed is:

1. A method of adjusting an internal pressure of a gas lifter, which is coupled to an openable object, such as a hood, a trunk lid or a tailgate, and has a structure such that the internal pressure of said gas lifter is adjusted when opening or closing said openable object, the method comprising:

measuring a variable opened angle of said openable object using an angle sensor; and adjusting the internal pressure of said gas lifter according to the measured opened angle of said openable object, wherein opening motion of said openable object is divided into four opening ranges and each of first, second and third opening internal pressure values is greater than a normal internal pressure of said gas lifter, and fourth opening internal pressure value is less than the normal internal pressure of said gas lifter.

2. The method as defined in claim 1, wherein, when said openable object is being opened, the internal pressure of said gas lifter decreases as said openable object approaches a completely opened state.

3. The method as defined in claim 2, wherein the first, second, third and fourth opening internal pressure values are applied to said gas lifter when said openable object is in first, second, third and fourth opening ranges, respectively, and the first through fourth opening internal pressure values satisfy a condition such that the first opening internal pressure value is greater than (>) the second opening internal pressure value, which is greater than (>) the third opening internal pressure value, which is greater than (>) the fourth opening internal pressure value.

4. A method of adjusting an internal pressure of a gas lifter, which is coupled to an openable object, such as a hood, a trunk lid or a tailgate, and has a structure such that the internal pressure of said gas lifter is adjusted when opening or closing said openable object, the method comprising:

measuring a variable opened angle of said openable object using an angle sensor; and adjusting the internal pressure of said gas lifter according to the measured opened angle of said openable object, wherein, when said openable object is being closed, the internal pressure of said gas lifter increases and then decreases as said openable object approaches a completely closed state and wherein a closing motion of said openable object is divided into four closing ranges and each of first, second and third closing internal pressure values is less than a normal internal pressure of said gas lifter.

5. The method as defined in claim 4, wherein the first, second, third and first closing internal pressure values are applied to said gas lifter when said openable object is in first, second, third and fourth closing ranges, respectively, and the first through third closing internal pressure values satisfy a condition such that the first closing internal pressure value is less than (<) the second closing internal pressure value, which is less than (<) the third closing internal pressure value.

* * * * *